(12) United States Patent
Noritake et al.

(10) Patent No.: US 9,857,045 B2
(45) Date of Patent: Jan. 2, 2018

(54) VEHICLE LAMP STRUCTURE

(71) Applicant: TOYOTA JIDOSHA KABUSHIKI KAISHA, Toyota-shi, Aichi-ken (JP)

(72) Inventors: Yuji Noritake, Toyota (JP); Ken Nishioka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 14/760,922

(22) PCT Filed: Dec. 19, 2013

(86) PCT No.: PCT/JP2013/084116
§ 371 (c)(1),
(2) Date: Jul. 14, 2015

(87) PCT Pub. No.: WO2014/112287
PCT Pub. Date: Jul. 24, 2014

(65) Prior Publication Data
US 2015/0345731 A1    Dec. 3, 2015

(30) Foreign Application Priority Data

Jan. 17, 2013  (JP) .................................. 2013-006471

(51) Int. Cl.
*F21S 8/10* (2006.01)
*B60Q 1/34* (2006.01)
*B60Q 1/44* (2006.01)
*B60Q 1/00* (2006.01)
*B60Q 1/30* (2006.01)

(52) U.S. Cl.
CPC ............ *F21S 48/24* (2013.01); *B60Q 1/0041* (2013.01); *B60Q 1/30* (2013.01); *B60Q 1/34* (2013.01); *B60Q 1/44* (2013.01); *F21S 48/2212* (2013.01)

(58) Field of Classification Search
CPC ... B60Q 1/30; B60Q 1/34; B60Q 1/44; B60Q 1/0041; F21S 48/24; F21S 48/2212
See application file for complete search history.

(56) References Cited

U.S. PATENT DOCUMENTS 4,895,693 A * 1/1990 Suzuki ................ B60Q 1/0041
                                                362/245
9,457,708 B2 * 10/2016 Noritake .............. B60Q 1/0041

FOREIGN PATENT DOCUMENTS

| JP | S56-159002 A | 12/1981 |
| JP | S62-76102 A | 4/1987 |
| JP | H0638105 U | 5/1994 |

(Continued)

*Primary Examiner* — Stephen F Husar
(74) *Attorney, Agent, or Firm* — Oliff PLC (57) ABSTRACT

A rear combination lamp is configured to include a door-side lamp portion, which has a first LED, a first housing, and a first lens, and a fender-side lamp portion, which has a second LED, a second housing, and a second lens. The door-side lamp portion and the fender-side lamp portion are disposed adjacent to one another in the vehicle width direction. Moreover, a second lamp-side reflector that reflects toward the second lens the light emitted from the second LED is disposed between the second housing and the second lens. Part of the second lamp-side reflector is configured as an interstitial reflecting portion that reflects the light emitted from the second LED between the first lens and the second lens.

5 Claims, 4 Drawing Sheets

(56) References Cited

FOREIGN PATENT DOCUMENTS

| | | |
|---|---|---|
| JP | H11-260108 A | 9/1999 |
| JP | 2005-276644 A | 10/2005 |
| JP | 2007-053046 A | 3/2007 |
| JP | 2014-123547 A | 7/2014 |

\* cited by examiner

VEHICLE LAMP STRUCTURE

TECHNICAL FIELD

The present invention relates to a vehicle lamp structure.

RELATED ART

Conventionally, an integrated type vehicle lamp (vehicle combination lamp) equipped with a cornering lamp and a side turn lamp has been disclosed (e.g., see Japanese Patent Application (JP-A) No. 2007-53046). To briefly describe the technology described in this document, in the vehicle lamp, a cornering lamp bulb and a side turn lamp bulb are disposed at the vehicle front side and the vehicle rear side, respectively, of a region demarcated between a lamp body and a lamp lens. Furthermore, a diffusing portion is disposed in the boundary portion between the region of the vehicle lamp at the vehicle front side and the region of the vehicle lamp on the vehicle rear side. Light emitted from the side turn lamp bulb is diffused by the diffusing portion, and thus the visibility of the side turn lamp from the side of the vehicle is improved.

SUMMARY OF INVENTION

Technical Problem

However, in a case in which the vehicle lamp described in JP-A No. 2007-53046 is made into a separate type, in which the cornering lamp and the side turn lamp are separate, and the cornering lamp and the side turn lamp are disposed in close proximity to one another, it is conceivable that the space between the cornering lamp and the side turn lamp will not be illuminated or that the space between the cornering lamp and the side turn lamp will be dark. In this case, the lamp lacks a sense of unity.

In consideration of the circumstances described above, it is an object of the present invention to obtain a vehicle lamp structure that can improve the sense of unity of a lamp configured to be a separate type.

Solution to Problem

A vehicle lamp structure pertaining to a first aspect includes: a first lamp that has a first housing to which a first light source is attached and a first lens that covers the first light source as a result of being fixed to the first housing and that transmits light emitted from the first light source; a second lamp that is disposed adjacent to the first lamp and has a second housing to which a second light source is attached and a second lens that covers the second light source as a result of being fixed to the second housing and that transmits light emitted from the second light source; and a second lamp-side reflector that is disposed between the second housing and the second lens and reflects toward the second lens the light emitted from the second light source, with a part of the second lamp-side reflector is configured as an interstitial reflecting portion that reflects between the first lens and the second lens the light emitted from the second light source.

According to this aspect, the first lamp and the second lamp are disposed adjacent to one another. When light is emitted from the first light source supported on the first housing, the light is transmitted through the first lens. That is, the first lamp lights up. When light is emitted from the second light source supported on the second housing, the light is reflected by the second lamp-side reflector and is thereafter transmitted through the second lens. That is, the second lamp lights up. Here, in the present aspect, part of the second lamp-side reflector is configured as the interstitial reflecting portion that reflects between the first lens and the second lens the light emitted from the second light source. Therefore, when the second lamp lights up, the space between the first lamp and the second lamp is illuminated.

A vehicle lamp structure pertaining to a second aspect is the first aspect, wherein a second lamp-side leg portion that extends along the first lens and an opposing portion that extends along the interstitial reflecting portion from an end portion of the second lamp-side leg portion on the second housing side are disposed in the second lens.

According to this aspect, the second lens has the second lamp-side leg portion and the opposing portion. Therefore, part of the light reflected by the interstitial reflecting portion of the second lamp-side reflector is transmitted through the opposing portion and illuminates the space between the first lamp and the second lamp. Furthermore, another part of the light reflected by the interstitial reflecting portion of the second lamp-side reflector is introduced into the opposing portion and is thereafter emitted from the end portion (the end portion on the side away from the second housing) of the second lamp-side leg portion. Therefore, in a state in which the second lamp is lit up, the area of the second lamp near the second lamp-side leg portion is prevented from becoming dark.

A vehicle lamp structure pertaining to a third aspect is the second aspect, wherein a lens cut that introduces, into the second lens, the light emitted from the interstitial reflecting portion toward the opposing portion, is disposed in the opposing portion.

According to this aspect, the lens cut is disposed at the opposing portion of the second lens. Therefore, it becomes easier for the light reflected by the interstitial reflecting portion of the second lamp-side reflector to be introduced through the opposing portion and into the second lens. Furthermore, the light introduced into the opposing portion is emitted from the end portion (the end portion on the side away from the second housing) of the second lamp-side leg portion. Therefore, in a state in which the second lamp is lit up, the area of the second lamp near the second lamp-side leg portion is prevented from becoming dark.

A vehicle lamp structure pertaining to a fourth aspect is the second aspect or the third aspect, wherein a second lamp-side inner diffuser that diffuses the light reflected by the second lamp-side reflector is disposed between the second lamp-side reflector and the second lens, and a step portion having an end portion of the second lamp-side inner diffuser disposed in close proximity thereto is formed in the second lamp-side leg portion.

According to this aspect, the second lamp-side inner diffuser that diffuses the light reflected by the second lamp-side reflector is disposed between the second lamp-side reflector and the second lens. Therefore, the light reflected by the second lamp-side reflector is diffused by the second lamp-side inner diffuser and is transmitted through the second lens. Because of that, the second lamp is illuminated more uniformly. Furthermore, the light introduced into the second lamp-side inner diffuser travels toward the end portion of the second lamp-side inner diffuser, and the light is introduced from the step portion formed in the second lamp-side leg portion of the second lens into the second lamp-side leg portion. Then, the light introduced into the second lamp-side leg portion is emitted from the end portion (the end portion on the side away from the second housing) of the second lamp-side leg portion.

A vehicle lamp structure pertaining to a fifth aspect is the fourth aspect, wherein a first lamp-side reflector that reflects toward the first lens the light emitted from the first light source, and a first lamp-side inner diffuser that diffuses the light reflected by the first lamp-side reflector, are disposed between the first housing and the first lens, a first lamp-side leg portion that extends along the second lamp-side leg portion is disposed in the first lens, and a step portion having an end portion of the first lamp-side inner diffuser disposed in close proximity thereto is formed in this first lamp-side leg portion.

According to this aspect, the first lamp-side reflector and the first lamp-side inner diffuser are disposed between the first housing and the first lens. Therefore, the light reflected by the first lamp-side reflector is diffused by the first lamp-side inner diffuser and is transmitted through the first lens. Because of this, the first lamp is illuminated more uniformly. Furthermore, the light introduced into the first lamp-side inner diffuser travels toward the end portion of the first lamp-side inner diffuser, and the light is introduced from the step portion formed in the first lamp-side leg portion of the first lens into the first lamp-side leg portion. Then, the light introduced into the first lamp-side leg portion is emitted from the end portion (the end portion on the side away from the first housing) of the first lamp-side leg portion.

A vehicle lamp structure pertaining to a sixth aspect is the fifth aspect, wherein an end portion of the first lamp-side leg portion on the side away from the first housing or an end portion of the second lamp-side leg portion on a side further away from the second housing is configured as a corner portion at which an angle formed by the corner portion and a direction in which the first lamp-side leg portion or the second lamp-side leg portion extends is set to an angle that is less than an angle of total reflection.

According to this aspect, the end portion (the end portion on the side away from the first housing) of the first lamp-side leg portion and the end portion (the end portion on the side away from the second housing) of the second lamp-side leg portion is configured as the corner portions. Therefore, the light traveling toward the end portion of the first lamp-side leg portion and the light traveling toward the end portion of the second lamp-side leg portion are emitted from the end portion of the first lamp-side leg portion and the end portion of the second lamp-side leg portion without being totally reflected by the end portion of the first lamp-side leg portion and the end portion of the second lamp-side leg portion.

Effects of Invention

The vehicle lamp structure pertaining to the first aspect has the advantageous effect of improving the sense of unity of a lamp configured to be a separate type.

The vehicle lamp structure pertaining to the second aspect has the advantageous effect of preventing the region of the second lamp that is in close proximity to the first lamp from being dark.

The vehicle lamp structure pertaining to the third aspect has the advantageous effect of further preventing the region of the second lamp that is in close proximity to the first lamp from being dark.

The vehicle lamp structure pertaining to the fourth aspect has the advantageous effect that it can more uniformly illuminate the second lamp and can prevent the region of the second lamp that is in close proximity to the first lamp from being dark.

The vehicle lamp structure pertaining to the fifth aspect has the advantageous effect that it can more uniformly illuminate the first lamp and can prevent the region of the first lamp that is in close proximity to the second lamp from being dark.

The vehicle lamp structure pertaining to the sixth aspect has the advantageous effect of further preventing the region of the first lamp that is in close proximity to the second lamp and the region of the second lamp that is in close proximity to the first lamp from being dark.

DESCRIPTION OF EMBODIMENT

Next, a vehicle lamp structure pertaining to an embodiment of the present invention will be described using FIG. 1 to FIG. 4. Note that arrow FR indicates frontward in the vehicle front-rear direction, arrow OUT indicates outward in the vehicle width direction, and arrow UP indicates upward in the vehicle up-down direction. Furthermore, in cases in which the directions of front-rear and up-down are indicated in the following description, these will be understood to mean front-rear in the vehicle front-rear direction and up-down in the vehicle up-down direction.

Figure 4:
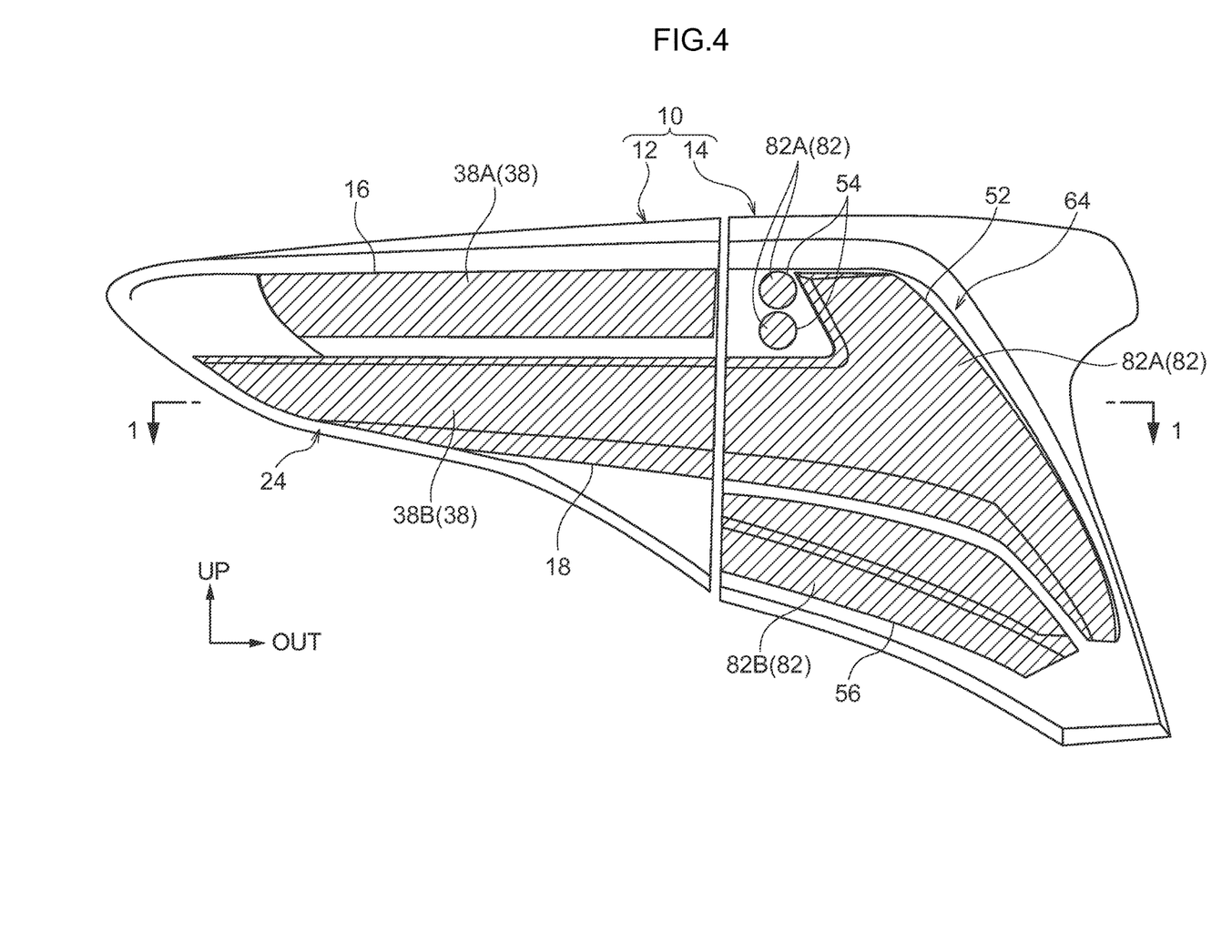
FIG. 4 is a front view showing the rear combination lamp as seen from the rear side of a vehicle.

As shown in FIG. 4, the vehicle lamp structure of the present embodiment is applied to a rear combination lamp 10 serving as a vehicle lamp disposed on the rear portion of the vehicle. The rear combination lamp 10 is configured to have a door-side lamp portion 12, which is configured as a first lamp attached to a non-illustrated back door that closes a back door open portion, and a fender-side lamp portion 14, which is configured as a second lamp attached to a rear end portion of a non-illustrated rear fender. Furthermore, the door-side lamp portion 12 and the fender-side lamp portion 14 are disposed adjacent to one another in a state in which the back door is closed. Below, first the door-side lamp portion 12 will be described and then the fender-side lamp portion 14 will be described.

(Door-Side Lamp Portion 12)

The door-side lamp portion 12 is configured to have a back lamp 16, which emits substantially white light in the vehicle rear direction to thereby let another party know that the vehicle will back up, and a tail lamp 18, which emits red light in the vehicle rear direction to thereby let another party know of the existence of the vehicle.

Figure 1:
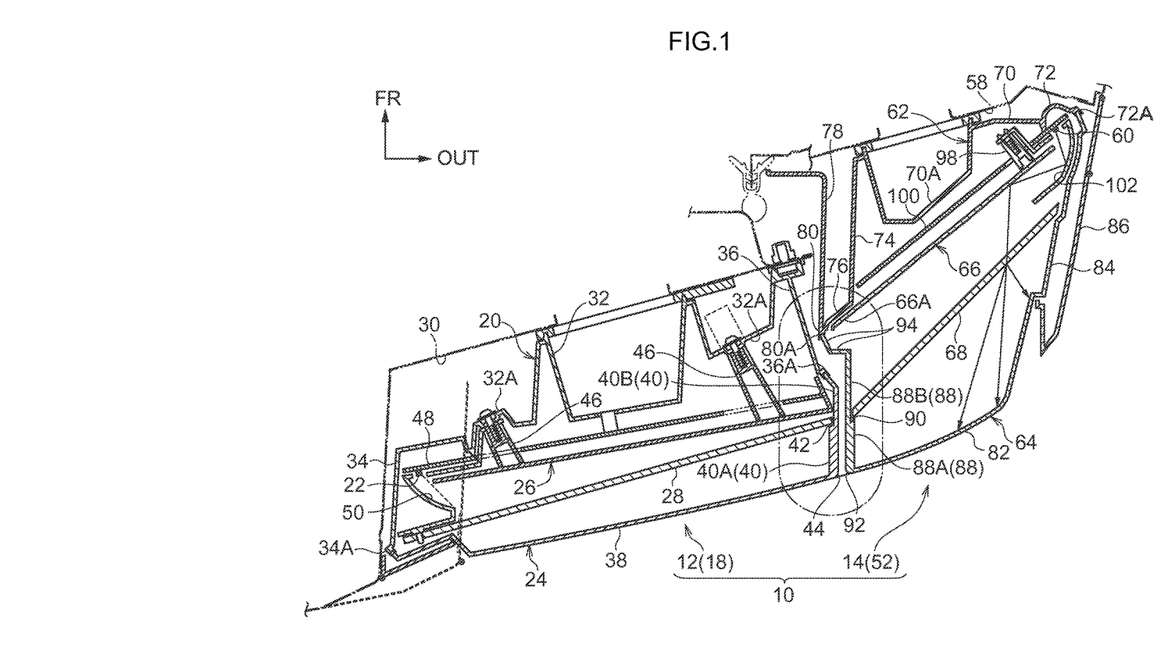
FIG. 1 is a cross-sectional view showing a cross section of a rear combination lamp cut along line 1-1 shown in FIG. 4.

As shown in FIG. 1, the door-side lamp portion 12 having the back lamp 16 and the tail lamp 18 is equipped with a first housing 20 that supports the door-side lamp portion 12 as a result of being fixed to the back door and supports light sources (a back lamp incandescent bulb and a first LED 22 serving as a first light source) of the back lamp 16 and the tail lamp 18. Furthermore, the door-side lamp portion 12 is equipped with a first lens 24 that covers the back lamp incandescent bulb (not shown in the drawings) and the first LED 22 as a result of being fixed to the first housing 20, and transmits the light emitted from the back lamp incandescent bulb and the first LED 22. Moreover, a first lamp-side reflector 26 that reflects toward the first lens 24 the light emitted from the first LED 22 and a first lamp-side inner diffuser 28 that diffuses the light reflected by the first lamp-side reflector 26 are disposed between the first housing 20 and the first lens 24.

The first housing 20 is formed in a box shape that is open in the vehicle rear direction, and the first housing 20 includes a bottom wall 32 that is fixed to a back door panel 30 that configures part of the back door. Reflector attachment portions 32A, which are formed in convex shapes in the vehicle rear direction and to which the first lamp-side reflector 26 described in detail later is attached, are formed in the bottom wall 32. The first housing 20 includes an inner wall 34 that extends in the vehicle rear direction from the vehicle width direction inside end portion of the bottom wall 32. The vehicle rear side end portion of the inner wall 34 is configured as a fixing portion 34A to which the first lens 24 is fixed. Moreover, the first housing 20 includes an outer wall 36 that extends in the vehicle rear direction from the vehicle width direction outside end portion of the bottom wall 32. The outer wall 36 extends in the vehicle rear direction while slanting outward in the vehicle width direction, and the vehicle rear side end portion of the outer wall 36 is configured as a fixing portion 36A to which the first lens 24 is fixed.

The first lens 24 is formed in a box shape that is open in the vehicle front direction. As shown in FIG. 4, the first lens 24 includes a bottom wall 38, which extends in the vehicle width direction and the vehicle up-down direction and is formed in a rectangular shape that narrows toward inward in the vehicle width direction as seen from the vehicle rear direction. The region of the bottom wall 38 on the vehicle upper side is configured as a back lamp light-transmitting portion 38A that is colorless and transparent. The region on the lower side of the back lamp light-transmitting portion 38A is configured as a tail lamp light-transmitting portion 38B that is red and transparent. Furthermore, as shown in FIG. 1, the vehicle width direction inside end portion of the bottom wall 38 is fixed to the fixing portion 34A of the first housing 20.

Figure 2:
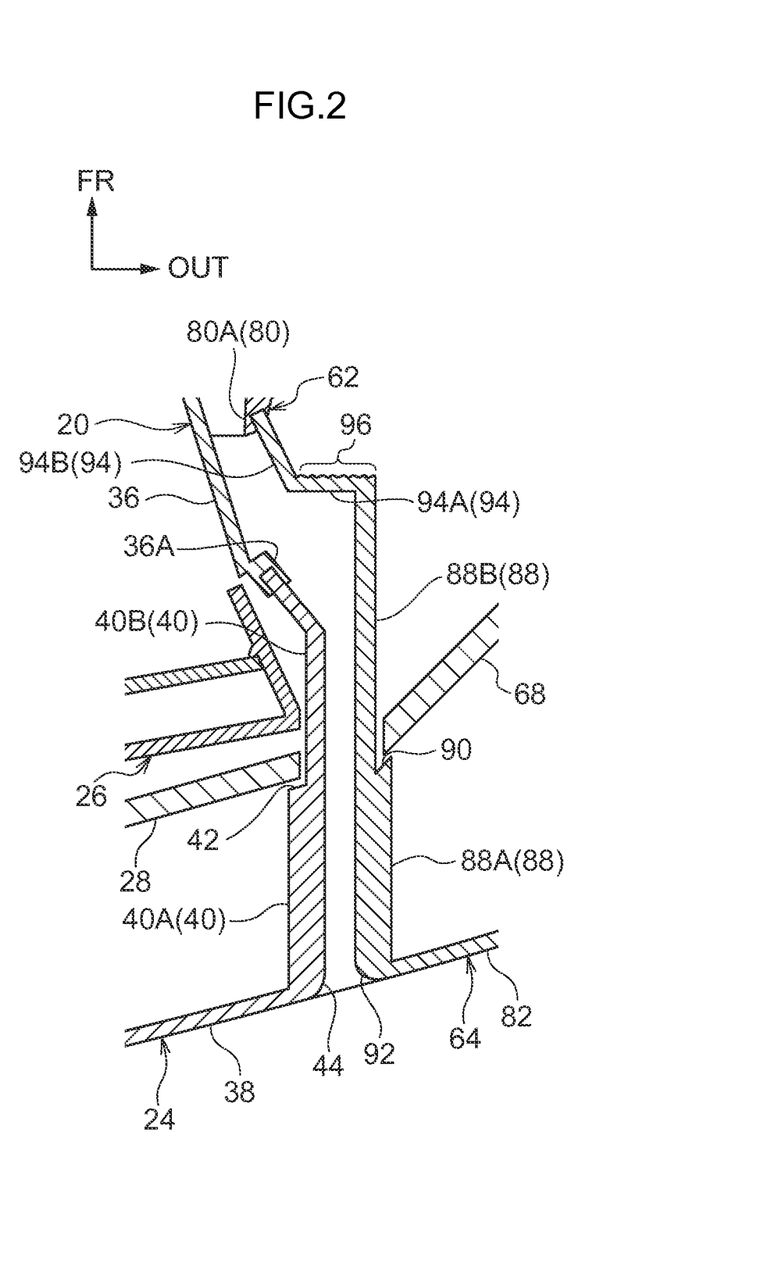
FIG. 2 is an enlarged cross-sectional view showing an enlargement of the region framed by the long dashed short dashed line shown in FIG. 1.
Figure 3:
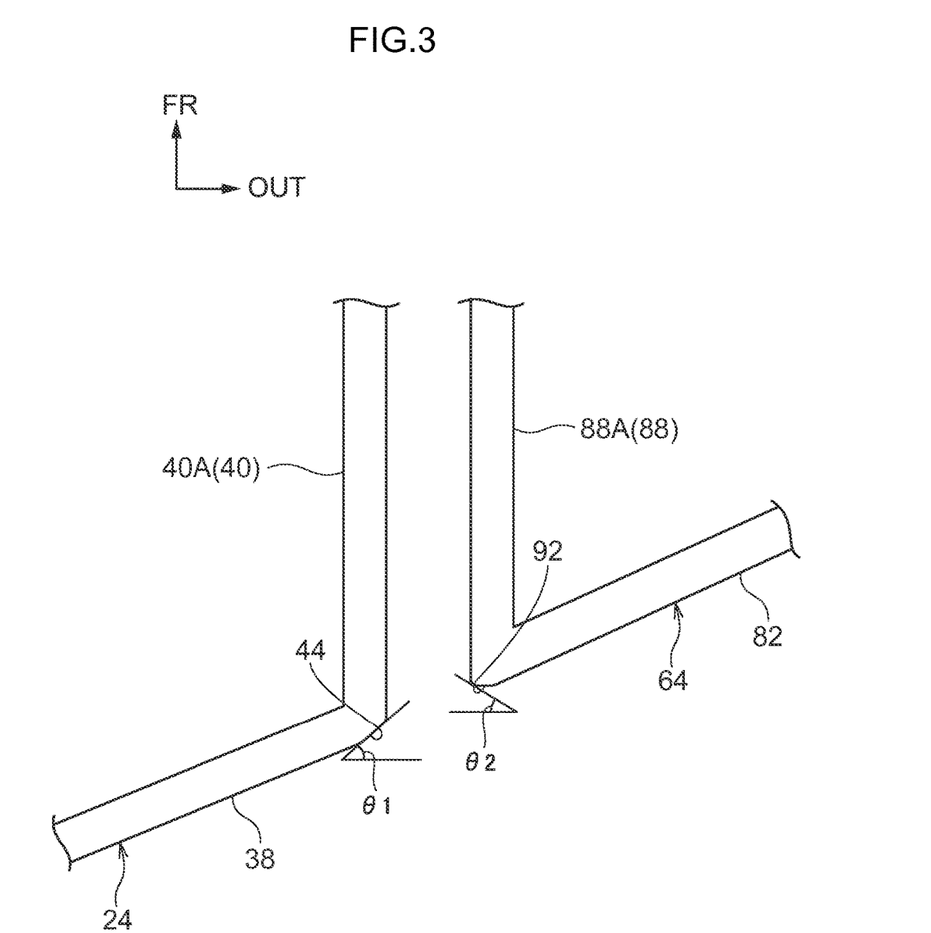
FIG. 3 is an enlarged cross-sectional view showing a further enlargement of the region framed by the long dashed short dashed line shown in FIG. 1.

As shown in FIG. 2, the first lens 24 includes a first lamp-side leg portion 40 that extends in the vehicle front direction from the vehicle width direction outside end portion of the bottom wall 38. The vehicle rear side region of the first lamp-side leg portion 40 is configured as a thick-walled portion 40A whose plate thickness in the vehicle width direction is thick, and the vehicle front side region of the first lamp-side leg portion 40 is configured as a thin-walled portion 40B whose plate thickness in the vehicle width direction is thin compared to the thick-walled portion 40A. The front end portion of the thin-walled portion 40B is bent inward in the vehicle width direction, and the distal end of this bent region is fixed to the fixing portion 36A of the first housing 20. A step portion 42 is formed at the boundary portion between the thick-walled portion 40A and the thin-walled portion 40B and in the vehicle width direction inside surface of the first lamp-side leg portion 40. Moreover, as shown in FIG. 3, the rear end portion (the end portion on the side away from the first housing 20) of the thick-walled portion 40A of the first lamp-side leg portion 40 is configured as a corner portion 44 at which an angle $\theta 1$ formed by that corner portion 44 and the direction in which the thick-walled portion 40A extends is set to an angle less than an angle of total reflection. In the present embodiment, because the first lens 24 is formed using acrylic resin, the angle $\theta 1$ is set to an angle less than 42.2 degrees.

As shown in FIG. 1, the first lamp-side reflector 26 is formed in a plate shape that extends in the vehicle width direction and the vehicle up-down direction, and support portions 46 supported on the reflector attachment portions 32A of the first housing 20 are disposed upright on the vehicle front side surface of the first lamp-side reflector 26. The vehicle rear side surface of the first lamp-side reflector 26 is finished to a mirror surface by aluminum deposition or the like.

The first LED 22 is attached to the vehicle width direction inside end portion of a base plate 48, and the first LED 22 emits light as a result of electrical power being supplied via the base plate 48. Moreover, the first LED 22 is fixed inside the door-side lamp portion 12 as a result of the base plate 48 being supported on the first housing 20. A concave reflector 50 is disposed on the rear side of the first LED 22. Because of this concave reflector 50, the light of the first LED 22 is reflected toward the vehicle rear surface of the first lamp-side reflector 26.

The first lamp-side inner diffuser 28 is disposed at the vehicle rear side of the first lamp-side reflector 26, and the first lamp-side inner diffuser 28 is formed in a plate shape that extends in the vehicle width direction and the vehicle up-down direction. A non-illustrated lens cut for diffusing the light of the first LED 22 reflected by the first lamp-side reflector 26 is disposed in the first lamp-side inner diffuser 28. When the light of the first LED 22 is transmitted through the first lamp-side inner diffuser 28, the light of the first LED 22 is diffused in a wide range in the vehicle width direction and the vehicle up-down direction. Moreover, as shown in FIG. 2, the vehicle width direction inside end portion of the first lamp-side inner diffuser 28 is supported on the reflector 50, and the vehicle width direction outside end portion of the first lamp-side inner diffuser 28 is disposed in close proximity to the step portion 42 formed in the first lamp-side leg portion 40 of the first lens 24.

(Fender-Side Lamp Portion 14)

As shown in FIG. 4, the fender-side lamp portion 14 is configured to have: a tail and stop lamp 52 that lights up at substantially the same illuminance as that of the tail lamp 18 of the door-side lamp portion 12 to thereby let another party know of the existence of the vehicle and, when the vehicle decelerates, lights up at a higher illuminance to thereby let another party know that the vehicle is decelerating; two stop lamps 54 that light up independently of the tail and stop lamp 52 to thereby let another party know that the vehicle is decelerating; and a turn signal lamp 56 that flashes in a predetermined cycle to thereby let another party know, for example, that the vehicle will turn.

Furthermore, as shown in FIG. 1, the fender-side lamp portion 14 is equipped with a second housing 62 that supports the fender-side lamp portion 14 as a result of being fixed to a rear end portion 58 of a rear fender, and that supports the light sources (a second LED 60 serving as a second light source, a stop lamp LED (not shown in the drawings), and a turn signal lamp incandescent bulb (not shown in the drawings)) of the tail and stop lamp 52, the stop lamps 54, and the turn signal lamp 56. Furthermore, the fender-side lamp portion 14 is equipped with a second lens 64 that covers the second LED 60, the stop lamp LED, and the turn signal lamp incandescent bulb as a result of being fixed to the second housing 62 and transmits the light emitted from the second LED 60, the stop lamp LED, and the turn signal lamp incandescent bulb. A second lamp-side reflector 66 that reflects toward the second lens 64 the light emitted from the second LED 60, and a second lamp-side inner diffuser 68 that diffuses the light reflected by the second lamp-side reflector 66, are disposed between the second housing 62 and the second lens 64.

The second housing 62 is formed in a box shape that is open in the vehicle rear direction, and is equipped with a bottom wall 70 that is fixed to the rear end portion 58 of the rear fender. A bulging portion 70A that bulges in the vehicle rear direction is formed in the vehicle width direction middle portion of the bottom wall 70. A projecting portion 72 that projects in the vehicle front direction is formed on the vehicle width direction outside end portion of the bottom wall 70, and the vehicle width direction outside end portion of the projecting portion 72 is configured as a fixing portion 72A to which the second lens 64 is fixed. The second housing 62 is equipped with a first inner wall portion 74 that extends in the vehicle front direction from the vehicle width direction inside end portion of the bottom wall 70, a slanted wall portion 76 that extends in the vehicle rear direction while slanting inward in the vehicle width direction from the rear end of the first inner wall portion 74, and a second inner wall portion 78 that extends in the vehicle front direction from the vehicle width direction inside end portion of the slanted wall portion 76. The boundary portion between the slanted wall portion 76 and the second inner wall portion 78 projects in the vehicle rear direction, and the distal end of this projecting section 80 is configured as a fixing portion 80A to which the second lens 64 is fixed.

The second lens 64 is formed in a box shape that is open in the vehicle front direction. As shown in FIG. 4, the second lens 64 is equipped with a bottom wall 82 that extends in the vehicle width direction and the vehicle up-down direction, and is formed in a substantially rectangular shape as seen from the vehicle rear direction. The region of the bottom wall 82 at the vehicle upper side is configured as tail lamp and stop lamp light-transmitting portions 82A that are red and transparent, and the region of the bottom wall 82 at the vehicle lower side is configured as a turn signal lamp light-transmitting portion 82B that is orange and transparent. As shown in FIG. 1, the second lens 64 is equipped with an outside leg portion 84 that extends in the vehicle front direction from the vehicle width direction outside end portion of the bottom wall 82. The distal end of the outside leg portion 84 is fixed to the fixing portion 72A of the second housing 62. Moreover, a garnish 86 is disposed on the vehicle width direction outside of the outside leg portion 84.

Furthermore, as shown in FIG. 2, the second lens 64 is equipped with a second lamp-side leg portion 88 that extends along the first lamp-side leg portion 40 of the first lens 24 from the vehicle width direction inside end portion of the bottom wall 82. The vehicle rear side region of the second lamp-side leg portion 88 is configured as a thick-walled portion 88A whose plate thickness in the vehicle width direction is thick, and the vehicle front side region of the second lamp-side leg portion 88 is configured as a thin-walled portion 88B whose plate thickness in the vehicle width direction is thin compared to the thick-walled portion 88A. A step portion 90 is formed at the boundary portion between the thick-walled portion 88A and the thin-walled portion 88B and in the vehicle width direction outside surface of the second lamp-side leg portion 88. As shown in FIG. 3, the rear end portion (the end portion on the side away from the second housing 62) of the thick-walled portion 88A of the second lamp-side leg portion 88 is configured as a corner portion 92 at which an angle θ2 formed by that corner portion 92 and the direction in which the thick-walled portion 88A extends is set to an angle less than an angle of total reflection. In the present embodiment, because the second lens 64 is formed using acrylic resin similarly to the first lens 24, the angle θ2 is set to an angle less than 42.2 degrees.

As shown in FIG. 2, the second lens 64 is equipped with an extension portion 94 that extends inward in the vehicle width direction from the front end portion of the second lamp-side leg portion 88. The extension portion 94 has an opposing portion 94A, in which the base end side of the extension portion 94 extends in the vehicle width direction, and a slanted wall portion 94B, in which the distal end side (vehicle width direction inside) of the extension portion 94 is bent in the vehicle front direction. A lens cut 96 that introduces into the second lens 64 the light emitted from an interstitial reflecting portion 66A toward the opposing portion 94A is formed in the vehicle front surface of the opposing portion 94A. The distal end of the slanted wall portion 94B is fixed to the fixing portion 80A of the second housing 62.

As shown in FIG. 1, the second lamp-side reflector 66 is formed in a plate shape that extends in the vehicle up-down direction, and the second lamp-side reflector 66 is disposed slanting outward in the vehicle width direction. A support portion 98 supported on the second housing 62 is disposed upright at the vehicle front surface of the second lamp-side reflector 66. The vehicle rear surface of the second lamp-side reflector 66 is finished to a mirror surface by aluminum deposition or the like. The light emitted from the second LED 60 can be thereby reflected toward the bottom wall 82 of the second lens 64. The vehicle width direction inside end portion of the second lamp-side reflector 66 is configured as an interstitial reflecting portion 66A that is disposed along the slanted wall portion 76 of the second housing 62, and the interstitial reflecting portion 66A is disposed opposing the opposing portion 94A of the second lens 64 in the vehicle front-rear direction. The light emitted from the second LED 60 can be thereby reflected, via the interstitial reflecting portion 66A, between the first lamp-side leg portion 40 of the first lens 24 and the second lamp-side leg portion 88 of the second lens 64.

The second LED 60 is attached to the vehicle width direction outside end portion of a base plate 100, and similarly to the first LED 22, the second LED 60 emits light as a result of electrical power being supplied via the base plate 100. Moreover, the second LED 60 is fixed inside the fender-side lamp portion 14 as a result of the base plate 100 being supported on the second housing 62. A concave reflector 102 is disposed at the rear side of the second LED 60. Because of this concave reflector 102, the light of the second LED 60 is reflected toward the vehicle rear surface of the second lamp-side reflector 66.

The second lamp-side inner diffuser 68 is disposed at the vehicle rear side of the second lamp-side reflector 66, and the second lamp-side inner diffuser 68 is formed in a plate shape that extends in substantially the same direction as the second lamp-side reflector 66. A non-illustrated lens cut for diffusing the light of the second LED 60 reflected by the second lamp-side reflector 66 is disposed at the second lamp-side inner diffuser 68. When the light of the second LED 60 is transmitted through the second lamp-side inner diffuser 68, the light of the second LED 60 is diffused in a wide range in the vehicle width direction and the vehicle up-down direction. As shown in FIG. 2, the vehicle width direction inside end portion of the second lamp-side inner diffuser 68 is disposed in close proximity to the step portion 90 formed in the second lamp-side leg portion 88 of the second lens 64.

Operation and Effects of Present Embodiment

Next, the operation and effects of the present embodiment will be described.

As shown in FIG. 1, in the present embodiment, when light is emitted from the first LED 22, the light is transmitted through the first lens 24. That is, the tail lamp 18 (see FIG. 4) lights up. When light is emitted from the second LED 60, the light is reflected by the second lamp-side reflector 66 and is thereafter transmitted through the second lens 64. That is, the tail and stop lamp 52 lights up. Here, in the present embodiment, part of the second lamp-side reflector 66 is configured as the interstitial reflecting portion 66A that reflects the light emitted from the second LED 60 between the first lamp-side leg portion 40 of the first lens 24 and the second lamp-side leg portion 88 of the second lens 64. Therefore, when the tail and stop lamp 52 lights up, the space between the first lamp-side leg portion 40 of the first lens 24 and the second lamp-side leg portion 88 of the second lens 64 is illuminated (the space between the door-side lamp portion 12 and the fender-side lamp portion 14 is illuminated). That is, in the present embodiment, the sense of unity of the rear combination lamp 10 configured to be a separate type can be improved.

Furthermore, in the present embodiment, the second lens 64 has the second lamp-side leg portion 88 and the opposing portion 94A. Therefore, part of the light reflected by the interstitial reflecting portion 66A of the second lamp-side reflector 66 is transmitted through the opposing portion 94A and illuminates the space between the first lamp-side leg portion 40 of the first lens 24 and the second lamp-side leg portion 88 of the second lens 64. Another part of the light reflected by the interstitial reflecting portion 66A of the second lamp-side reflector 66 is introduced into the opposing portion 94A and is thereafter emitted from the end portion (the end portion on the side away from the second housing) of the second lamp-side leg portion 88. Therefore, in a state in which the tail and stop lamp 52 is lit up, the area of the tail and stop lamp 52 near the second lamp-side leg portion can be prevented from being dark.

Moreover, as shown in FIG. 2, in the present embodiment, the lens cut 96 is disposed at the opposing portion 94A of the second lens 64. Therefore, it is easier for the light reflected by the interstitial reflecting portion 66A of the second lamp-side reflector 66 to be introduced through the opposing portion 94A and into the second lens 64. The light introduced into the opposing portion 94A is emitted from the end portion (the end portion on the side away from the second housing 62) of the second lamp-side leg portion 88. Therefore, in a state in which the tail and stop lamp 52 is lit up, the area of the tail and stop lamp 52 near the second lamp-side leg portion 88 can further be prevented from being dark.

Furthermore, as shown in FIG. 1, in the present embodiment, the second lamp-side inner diffuser 68 that diffuses the light reflected by the second lamp-side reflector 66 is disposed between the second lamp-side reflector 66 and the second lens 64. Therefore, the light reflected by the second lamp-side reflector 66 is diffused by the second lamp-side inner diffuser 68 and is transmitted through the second lens 64. This thereby enables the tail and stop lamp 52 to be illuminated more uniformly. The light introduced into the second lamp-side inner diffuser 68 travels toward the end portion (the vehicle width direction inside end portion) of the second lamp-side inner diffuser 68, and the light is introduced from the step portion 90 formed in the second lamp-side leg portion 88 of the second lens 64 into the second lamp-side leg portion 88. Then, the light introduced into the second lamp-side leg portion 88 is emitted from the end portion (the end portion on the side away from the second housing 62) of the second lamp-side leg portion 88. Therefore, in the present embodiment, the area of the tail and stop lamp 52 near the second lamp-side leg portion 88 can further be prevented from being dark.

Moreover, in the present embodiment, the first lamp-side reflector 26 and the first lamp-side inner diffuser 28 are disposed between the first housing 20 and the first lens 24. Therefore, the light reflected by the first lamp-side reflector 26 is diffused by the first lamp-side inner diffuser 28 and is transmitted through the first lens 24. The tail lamp 18 can be thereby illuminated more uniformly. Furthermore, the light introduced into the first lamp-side inner diffuser 28 travels toward the end portion (the vehicle width direction outside end portion) of the first lamp-side inner diffuser 28, and the light is introduced from the step portion 42 formed in the first lamp-side leg portion 40 of the first lens 24 into the first lamp-side leg portion 40. Then, the light introduced into the first lamp-side leg portion 40 is emitted from the end portion (the end portion on the side away from the first housing 20) of the first lamp-side leg portion 40. In the present embodiment, the area of the tail lamp 18 near the first lamp-side leg portion 40 can be thereby prevented from becoming dark.

Furthermore, as shown in FIG. 3, in the present embodiment, the rear end portion of the first lamp-side leg portion 40 and the rear end portion of the second lamp-side leg portion 88 are configured as the corner portions 44 and 92. Therefore, the light traveling toward the rear end portion of the first lamp-side leg portion 40 and the light traveling toward the rear end portion of the second lamp-side leg portion 88 are emitted from the rear end portion of the first lamp-side leg portion 40 and the rear end portion of the second lamp-side leg portion 88 without being totally reflected by the corner portions 44 and 92. In the present embodiment, the boundary portion between the door-side lamp portion 12 and the fender-side lamp portion 14 can be thereby prevented from becoming dark.

Moreover, as shown in FIG. 2, in the present embodiment, the distal end of the extension portion 94 of the second lens 64 (the distal end of the slanted wall portion 94B) is fixed to the fixing portion 80A of the second housing 62. Therefore, compared to a case where the end portion of the second lamp-side leg portion 88 on the second housing 62 side is fixed to the second housing 62, it becomes more difficult to be affected by the vehicle width direction dimension of the fixing portion 80A, and the first lamp-side leg portion 40 of the first lens 24 and the second lamp-side leg portion 88 of the second lens 64 can be disposed in close proximity to one another. That is, the door-side lamp portion 12 and the fender-side lamp portion 14 that configure the rear combination lamp 10 can be disposed in close proximity to one another. In the present embodiment, the sense of unity of the rear combination lamp 10 configured to be a separate type can be thereby improved.

Next, the action and effects in a state in which the tail lamp 18 and the tail and stop lamp 52 are not lit up will be described.

In the present embodiment, when, due to sunlight or the like being emitted toward the bottom wall 82 of the second lens 64, that light such as sunlight enters the second lens 64, the light travels from the second lamp-side leg portion 88 toward the extension portion 94, and the light is emitted from the opposing portion 94A of the extension portion 94 toward the space between the first lamp-side leg portion 40 and the second lamp-side leg portion 88. Therefore, the space between the first lamp-side leg portion 40 and the second lamp-side leg portion 88 (the interstice between the door-side lamp portion 12 and the fender-side lamp portion 14) is prevented from appearing dark. In the present embodiment, the sense of unity of the rear combination lamp 10 can be thereby improved even in a state in which the tail lamp 18 and the tail and stop lamp 52 are not lit up.

Furthermore, in the present embodiment, the first lamp-side inner diffuser 28 is disposed inside the door-side lamp portion 12 and the second lamp-side inner diffuser 68 is disposed inside the fender-side lamp portion 14. Therefore, when light such as sunlight is introduced into the inner diffusers (into the first lamp-side inner diffuser 28 and the second lamp-side inner diffuser 68), the light travels toward the end portions of the inner diffusers, and the light is introduced from the step portions 42 and 90 formed in the first lamp-side leg portion 40 of the first lens 24 and the second lamp-side leg portion 88 of the second lens 64 into the first lamp-side leg portion 40 and into the second lamp-side leg portion 88. Then, the light introduced into the first lamp-side leg portion 40 and into the second lamp-side leg portion 88 is emitted from the end portions (the vehicle rear side end portions) of the first lamp-side leg portion 40 and the second lamp-side leg portion 88. Therefore, the boundary portion between the door-side lamp portion 12 and the fender-side lamp portion 14 is prevented from appearing dark, and the sense of unity of the rear combination lamp 10 is improved even more.

In the present embodiment, an example has been described where the step portions 42 and 90 are disposed in the first lamp-side leg portion 40 of the first lens 24 and the second lamp-side leg portion 88 of the second lens 64 and where the end portions of the inner diffusers (the first lamp-side inner diffuser 28 and the second lamp-side inner diffuser 68) are disposed in close proximity to the step portions 42 and 90. However, the present invention is not limited to this. That is, the present invention can also be given a configuration not provided with the step portions 42 and 90, or can also be given a configuration not provided with the inner diffusers. Whether or not to dispose the step portions 42 and 90 and the inner diffusers may be appropriately set in consideration of the light reflection characteristics of the reflectors (the first lamp-side reflector 26 and the second lamp-side reflector 66).

Furthermore, in the present embodiment, an example has been described where the rear end portion of the first lamp-side leg portion 40 and the rear end portion of the second lamp-side leg portion 88 are configured as the corner portions 44 and 92. However, the present invention is not limited to this. For example, the present invention may also be given a configuration not provided with the corner portions 44 and 92 in a case in which the sense of unity of the rear combination lamp 10 will not be compromised even if the light traveling toward the rear end portion of the first lamp-side leg portion 40 and the light traveling toward the rear end portion of the second lamp-side leg portion 88 are totally reflected at these rear end portions.

Moreover, in the present embodiment, an example has been described where the second lens 64 has the second lamp-side leg portion 88 and the opposing portion 94A. However, the present invention is not limited to this. For example, the present invention can also be given a configuration not provided with the second lamp-side leg portion 88 and the opposing portion 94A in a case in which a sufficient sense of unity for the rear combination lamp 10 can be obtained by emitting, between the first lamp-side leg portion 40 of the first lens 24 and the second lamp-side leg portion 88 of the second lens 64, the light reflected by the interstitial reflecting portion 66A of the second lamp-side reflector 66.

Furthermore, in the present embodiment, an example has been described where the present invention is applied to the rear combination lamp 10. However, the present invention can also be applied to another vehicle lamp configured to be a separate type.

An embodiment of the present invention has been described above, but the present invention is not limited to what is described above, and can of course be modified and implemented in a variety of ways in addition to those described above without departing from the spirit thereof.

The invention claimed is:

1. A vehicle lamp structure comprising:
    a first lamp that has
        a first housing to which a first light source is attached and
        a first lens that covers the first light source as a result of being fixed to the first housing and that transmits light emitted from the first light source;
    a second lamp that is disposed adjacent to the first lamp and has
        a second housing to which a second light source is attached and
        a second lens that covers the second light source as a result of being fixed to the second housing and that transmits light emitted from the second light source; and
    a second lamp-side reflector that is disposed between the second housing and the second lens and reflects, toward the second lens, the light emitted from the second light source,
    wherein the first lens is equipped with a first lamp-side leg portion that extends in a vehicle front and rear direction,
    the second lens is equipped with
        a second lamp-side leg portion that extends along the first lamp-side leg portion and
        an extension portion that extends toward the first lamp from an end portion of the second lamp-side leg portion on a side of the second housing,
    a part of the second lamp-side reflector is configured as an interstitial reflecting portion that reflects, between the first lamp-side leg portion and the second lamp-side leg portion, the light emitted from the second light source, and
    the interstitial reflecting portion and a part of the extension portion are disposed opposing one another in the vehicle front and rear direction.

2. The vehicle lamp structure according to claim 1, wherein a lens cut that introduces, into the second lens, the light emitted from the interstitial reflecting portion toward the extension portion, is disposed in the extension portion.

3. The vehicle lamp structure according to claim 1, wherein:
    a second lamp-side inner diffuser that diffuses the light reflected by the second lamp-side reflector is disposed between the second lamp-side reflector and the second lens, and
    a step portion having an end portion of the second lamp-side inner diffuser disposed in close proximity thereto is formed in the second lamp-side leg portion.

4. The vehicle lamp structure according to claim 3, wherein:
    a first lamp-side reflector that reflects, toward the first lens, the light emitted from the first light source, and a first lamp-side inner diffuser that diffuses the light reflected by the first lamp-side reflector, are disposed between the first housing and the first lens, and a step portion having an end portion of the first lamp-side inner diffuser disposed in close proximity thereto is formed in the first lamp-side leg portion.

5. The vehicle lamp structure according to claim 1, wherein an end portion of the first lamp-side leg portion on a side further away from the first housing or an end portion of the second lamp-side leg portion on a side further away from the second housing is configured as a corner portion at which an angle formed by the corner portion and a direction in which the first lamp-side leg portion or the second lamp-side leg portion extends is set to an angle that is less than an angle of total reflection.

* * * * *